United States Patent
Imoto et al.

(10) Patent No.: US 9,110,428 B2
(45) Date of Patent: Aug. 18, 2015

(54) ELECTRICAL CABLE CONNECTING APPARATUS, METHOD FOR CONNECTING ELECTRICAL CABLE, AND IMAGE FORMING APPARATUS

(71) Applicant: Sharp Kabushiki Kaisha, Osaka (JP)

(72) Inventors: Masahiro Imoto, Osaka (JP); Yasumasa Morimoto, Osaka (JP); Toshiki Ohgita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 260 days.

(21) Appl. No.: 13/670,637

(22) Filed: Nov. 7, 2012

(65) Prior Publication Data

US 2013/0122741 A1 May 16, 2013

(30) Foreign Application Priority Data

Nov. 15, 2011 (JP) ................................. 2011-249647

(51) Int. Cl.
*H01R 13/60* (2006.01)
*G03G 21/16* (2006.01)
(Continued)

(52) U.S. Cl.
CPC ................ *G03G 15/80* (2013.01); *G03G 15/60* (2013.01); *G03G 21/1652* (2013.01); *H02G 15/18* (2013.01); *H02G 3/32* (2013.01)

(58) Field of Classification Search
CPC ............... H01R 13/60; H01R 13/5804; H01R 13/5825; H01R 13/5829; H01R 13/5845; H01R 23/661; H04N 1/4097; H04N 1/2032; H04N 1/407; H04N 1/12; H04N 1/193; H04N 1/00519; G03G 21/16; G03G 15/50; G03G 15/00; H05K 5/003; H05K 5/0247; H05K 5/0026; H05K 5/02; H05K 7/00; H02G 3/0418; H02G 15/02; H02G 7/08; H02G 7/04
USPC .................................... 174/92, 48, 52.1, 65 R
See application file for complete search history.

(56) References Cited

U.S. PATENT DOCUMENTS 2,131,165 A * 9/1938 Clements ....................... 174/669
3,879,571 A * 4/1975 Reed ............................. 174/662
(Continued)

FOREIGN PATENT DOCUMENTS

JP     57-203591     6/1981
JP     03-120793     5/1991
(Continued)

OTHER PUBLICATIONS

Partial translation of Notice of Reasons for Refusal for corresponding Japanese Application No. 2011-249647 dated Sep. 17, 2013.

*Primary Examiner* — Timothy Thompson
*Assistant Examiner* — Michael F McAllister
(74) *Attorney, Agent, or Firm* — Renner, Otto, Boisselle & Sklar, LLP

(57) ABSTRACT

An image forming apparatus main body (apparatus main body) and an automatic document feeder mounted on the apparatus main body are provided, and a cable-side connector provided at a front end of an electrical cable extending from the automatic document feeder is removably connected to a board-side connector provided on a circuit board of the apparatus main body. In this configuration, an opening portion is provided in a back face of a housing of the apparatus main body at a position opposing the board-side connector, a lid that covers this opening portion is attached to a front end portion of the electrical cable by an attachment member, and this lid is configured so as to be attachable to the opening portion by a hook and fixing by screwing by means of a screw insertion boss.

22 Claims, 7 Drawing Sheets

(51) Int. Cl.
*H02G 15/18* (2006.01)
*H05K 7/00* (2006.01)
*G03G 15/00* (2006.01)
*H01R 13/58* (2006.01)
*H04N 1/04* (2006.01)
*H02G 3/32* (2006.01)

(56) References Cited

U.S. PATENT DOCUMENTS

| | | | | |
|---|---|---|---|---|
| 4,988,831 | A | * | 1/1991 | Wilson et al. .................. 174/662 |
| 5,234,358 | A | * | 8/1993 | Polgar ........................... 439/465 |
| 5,693,908 | A | * | 12/1997 | Amberger ...................... 174/656 |
| 2004/0238199 | A1 | * | 12/2004 | Yamanaka et al. ............ 174/68.1 |
| 2012/0060425 | A1 | * | 3/2012 | Yamauchi et al. ............... 49/501 |
| 2013/0122741 | A1 | | 5/2013 | Imoto et al. |

FOREIGN PATENT DOCUMENTS

| | | | | |
|---|---|---|---|---|
| JP | 4-56383 | | 5/1992 | |
| JP | 2678898 | | 8/1997 | |
| JP | 2003-51683 | * | 6/2001 | ............... H05K 7/00 |
| JP | 2003-051683 | | 2/2003 | |
| JP | 2003-207962 | | 7/2003 | |
| JP | 2006-263259 | | 10/2006 | |
| JP | 2013-105938 | | 5/2013 | |

* cited by examiner

ELECTRICAL CABLE CONNECTING APPARATUS, METHOD FOR CONNECTING ELECTRICAL CABLE, AND IMAGE FORMING APPARATUS

CROSS-REFERENCE TO RELATED APPLICATIONS

This application claims priority under 35 U.S.C. §119(a) on Patent Application No. 2011-249647 filed in Japan on Nov. 15, 2011, the entire contents of which are herein incorporated by reference.

FIELD OF THE INVENTION

The present invention relates to an electrical cable connecting apparatus including a first apparatus, and a second apparatus that is mounted on the first apparatus, and having a configuration in which a cable-side connector provided at a front end of an electrical cable extending from the second apparatus is removably connected to a board-side connector provided on a circuit board of the first apparatus, a method for connecting an electrical cable, and an image forming apparatus.

DESCRIPTION OF THE RELATED ART

In a conventional image forming apparatus, an automatic document feeder is mounted on an image forming apparatus main body equipped with an image formation portion, a scanner portion, and a paper conveyance portion, and the image forming apparatus main body and the automatic document feeder are combined by connecting a cable-side connector provided at a front end portion of an electrical cable extending from the automatic document feeder to a board-side connector provided on a circuit board installed in the image forming apparatus main body.

In the case of an image forming apparatus having such a configuration, when the automatic document feeder is removed from the image forming apparatus main body, conventionally, a backplate of the image forming apparatus main body is removed before the cable-side connector of the electrical cable is disconnected from the board-side connector. Also, when the automatic document feeder is attached to the image forming apparatus main body, after the backplate of the image forming apparatus main body is removed, the cable-side connector of the electrical cable of the automatic document feeder is connected to the board-side connector, and then, the backplate is attached to a back face of the image forming apparatus main body.

Operations as described above are not particularly problematic during production in a factory, but, for example, when replacement or the like of the automatic document feeder is performed at an installation site after the shipment, a space to remove the backplate is required, and in places where this space is not available, these operations are very troublesome. For this reason, there has been a demand for a structure that enables easy attachment and removal of the automatic document feeder.

Moreover, connecting apparatuses for electrical cables are required to have a connecting structure that can withstand a tensile strength of 10 kgf that acts as an external force, and therefore, with respect to the stability, a more stable structure has also been in demand.

As an example of a connecting apparatus for an electrical cable, JP 2003-51683A discloses an electrical cable attachment apparatus.

This electrical cable attachment apparatus is configured so that in order to electrically connect a main body unit to an automatic document supply unit that is coupled at its one end to the main body unit via a hinge unit so that it can be opened/closed, an electrical cable from the main body unit is connected to the automatic document supply unit, and the electrical cable attachment apparatus has a structure in which the electrical cable is connected to a connector on a board provided in the automatic document supply unit and is fixed to the board by a wire bundling band.

This electrical cable attachment apparatus disclosed in JP 2003-51683A facilitates assembly of the electrical cable and the board.

SUMMARY OF THE INVENTION

However, even in the case of the electrical cable attachment apparatus disclosed in JP 2003-51683A, to attach the electrical cable to the main body unit, it is necessary to remove the entire backplate on a back side of the main body unit, and in places where an open space to remove the backplate is not available, there is a problem in that the operations for attaching the electrical cable to the main body side or removing the electrical cable therefrom inevitably become very troublesome.

Moreover, in the electrical cable attachment apparatus disclosed in JP 2003-51683A, since the electrical cable is fixed to the board, there is a possibility that if some external force is applied to the electrical cable, the board may also be damaged, and the problem of stability still remains unsolved.

The present invention has been contrived to solve the problems as described above, and it is an object thereof to provide an electrical cable connecting apparatus that is configured so that when an electrical cable extending from a first apparatus is attached to an apparatus main body side serving as a second apparatus, the attachment (or the removal) can be easily performed without the need to remove a backplate, and that has a structure providing a sufficient attachment strength, a method for connecting an electrical cable, and an image forming apparatus.

In order to solve the above-described problems, an electrical cable connecting apparatus of the present invention is an electrical cable connecting apparatus including a first apparatus, and a second apparatus that is mounted on the first apparatus, and having a configuration in which a cable-side connector provided at a front end of an electrical cable extending from the second apparatus is removably connected to a board-side connector provided on a circuit board of the first apparatus, wherein an opening portion is provided in a housing of the first apparatus at a position opposing the board-side connector, a lid that covers the opening portion is attached to a front end portion of the electrical cable by an attachment member, and the lid is configured to be attachable to the opening portion by a fixing member in a state in which the cable-side connector is connected to the board-side connector.

With the electrical cable connecting apparatus of the present invention, for example, when the second apparatus is removed from the first apparatus, it is not necessary to remove entirely a face (e.g., a backplate) of the housing that is disposed opposing the board-side connector, and the cable-side connector of the electrical cable attached to the lid can be easily removed from the board-side connector simply by removing only the lid from the opening portion. Moreover, since the electrical cable is attached and fixed to the lid by the attachment member, even if some external force is applied to the electrical cable, this external force is first applied to the attachment member on the lid and is not directly applied to a connecting portion between the connectors, and therefore there is no risk that the circuit board and the board-side connector may be damaged.

Moreover, when the second apparatus is mounted on the first apparatus, it is only required that the second apparatus, with the lid attached to the electrical cable, is mounted on the first apparatus, thereafter, the cable-side connector of the electrical cable is connected to the board-side connector of the first apparatus, and the lid is attached and fixed to the opening portion by the fixing member. Thus, the attachment operation is simple.

Moreover, according to the electrical cable connecting apparatus of the present invention, it is also possible to adopt a configuration in which the opening portion and the lid are each formed into a rectangular shape, and the fixing member includes a hook that is provided on one side edge portion of the lid and is for engaging with a side edge portion of the opening portion, and a screw fixing portion that is provided on another side edge portion side opposing the one side edge portion of the lid and is for fixing to a main body side of the first apparatus.

With this configuration, as a result of using the hook as one component of the fixing member, fixing by screwing is only required on the other side, and accordingly the operation for attaching the lid is simplified. Moreover, since the other side is fixed by screwing, even if some external force is applied, the possibility that the circuit board and the board-side connector may be damaged can be reduced, because the lid itself is firmly fixed.

Moreover, according to the electrical cable connecting apparatus of the present invention, it is also possible to adopt a configuration in which the attachment member is provided on a rear face of the lid at a position between the hook and the screw fixing portion and toward the screw fixing portion.

With this configuration, an external force that is applied to the electrical cable for some reason can be received by the attachment member and the screw fixing portion of the fixing member, and thus the possibility that the circuit board and the board-side connector may be damaged can be reduced.

Moreover, according to the electrical cable connecting apparatus of the present invention, it is also possible to adopt a configuration in which an opening-side cable outlet portion through which the electrical cable extends to the outside is provided in the opening portion, and when the lid is attached to the opening portion, the opening-side cable outlet portion is disposed in the vicinity of the screw fixing portion of the lid.

With this configuration, if some external force is applied to the electrical cable, the load of this external force will first be applied to an edge portion of the lid in the vicinity of a cable outlet portion, but there is no risk that the lid may become detached from the opening portion, because the screw fixing portion is located in the vicinity of this edge portion of the lid and is firmly fixed to the main body side of the first apparatus. Moreover, since the electrical cable is firmly attached to the lid by the attachment member that is disposed in the vicinity of the screw fixing portion, the applied external force is not directly applied to the connecting portion between the connectors. Therefore, damage to the circuit board and the board-side connector can be prevented.

Moreover, according to the electrical cable connecting apparatus of the present invention, it is also possible to adopt a configuration in which a lid-side cable outlet portion through which the electrical cable extends to the outside is provided in the lid at a position of a side edge portion opposing the opening-side cable outlet portion, and the lid-side cable outlet portion is disposed in the vicinity of the screw fixing portion.

With this configuration, if some external force is applied to the electrical cable, the load of this external force will first be applied to an edge portion of the lid-side cable outlet portion of the lid, but there is no risk that the lid may become detached from the opening portion, because the screw fixing portion is located in the vicinity of the edge portion of this lid-side cable outlet portion and is firmly fixed to the main body side of the first apparatus. Moreover, since the electrical cable is firmly attached to the lid by the attachment member that is disposed in the vicinity of the screw fixing portion, the applied external force is not directly applied to the connecting portion between the connectors. Therefore, damage to the circuit board and the board-side connector can be prevented.

Moreover, according to the electrical cable connecting apparatus of the present invention, it is also possible to adopt a configuration in which the screw fixing portion has a structure where both sides of the electrical cable are fixed. In this manner, by employing a structure in which the screw fixing portion is fixed on both sides of the electrical cable in the vicinity of the lid-side cable outlet portion, it is possible to strengthen a force for fixing the electrical cable against an external force even more.

Moreover, according to the electrical cable connecting apparatus of the present invention, it is also possible to adopt a configuration in which a positioning means that determines an arrangement position of the electrical cable is provided between the lid-side cable outlet portion and the attachment member. In this manner, as a result of providing the positioning means, it is possible to properly position and fix the electrical cable on the rear face of the lid.

Moreover, a method for connecting an electrical cable of the present invention that uses an electrical cable connecting apparatus having the above-described configuration includes the steps of attaching the front end portion of the electrical cable to the lid by the attachment member, connecting the cable-side connector of the electrical cable with the lid attached thereto to the board-side connector, and fixing the lid to the opening portion of the housing by the fixing member.

With this feature, after the cable-side connector is connected to the board-side connector, the electrical cable can also be fixed simply by attaching the lid to the opening portion. That is to say, after the cable-side connector is connected to the board-side connector, the process for attaching the electrical cable to the main body side of the first apparatus or the rear face of the lid can be omitted, and the manufacturing process can be simplified accordingly.

Moreover, in an image forming apparatus including an electrical cable connecting apparatus having the above-described configuration, an image forming apparatus main body including at least an image formation portion and a scanner portion can be used as the first apparatus, and an automatic document feeder can be used as the second apparatus.

According to the present invention, when the automatic document feeder is removed from the image forming apparatus main body, with regard to the electrical cable, it is only required to remove the lid from the housing of the image forming apparatus main body, and thus the removal operation is facilitated. Moreover, also when the automatic document feeder is replaced, an automatic document feeder with the lid attached to the electrical cable is brought to the installation site of the image forming apparatus and mounted on the image forming apparatus main body at the site, and with regard to the electrical cable, it is only required that the cable-side connector of the electrical cable is inserted through the opening portion provided in the back face of the housing and connected to the board-side connector, and in this state, the lid is fixed to the opening portion. Thus, the operation for replacing the automatic document feeder is also facilitated.

DESCRIPTION OF THE PREFERRED EMBODIMENTS

Hereinafter, an embodiment of the present invention will be described with reference to the drawings.

Figure 1:
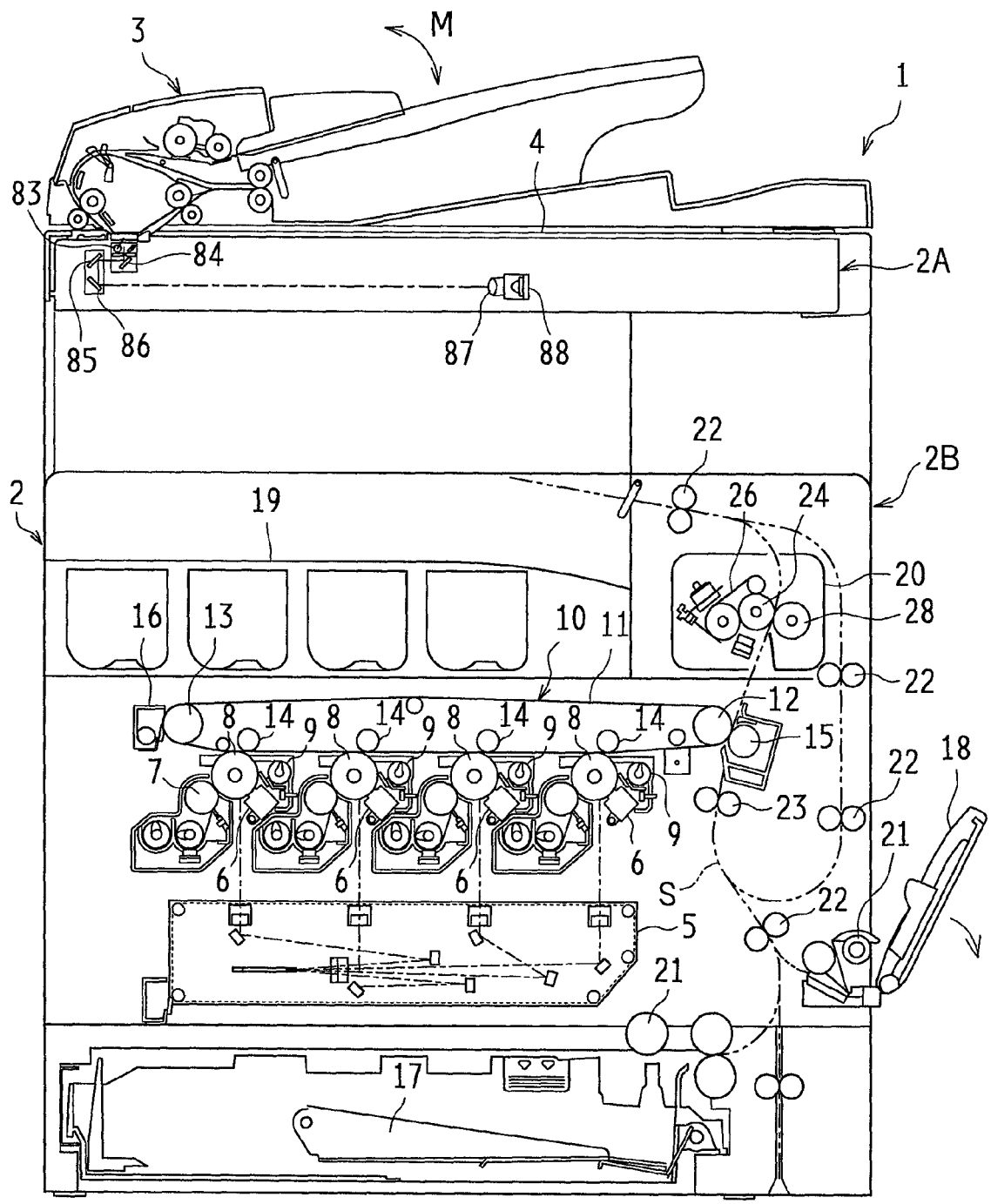
FIG. 1 is a schematic cross-sectional view showing an example of the configuration of an image forming apparatus according to an embodiment of the present invention.
Figure 2:
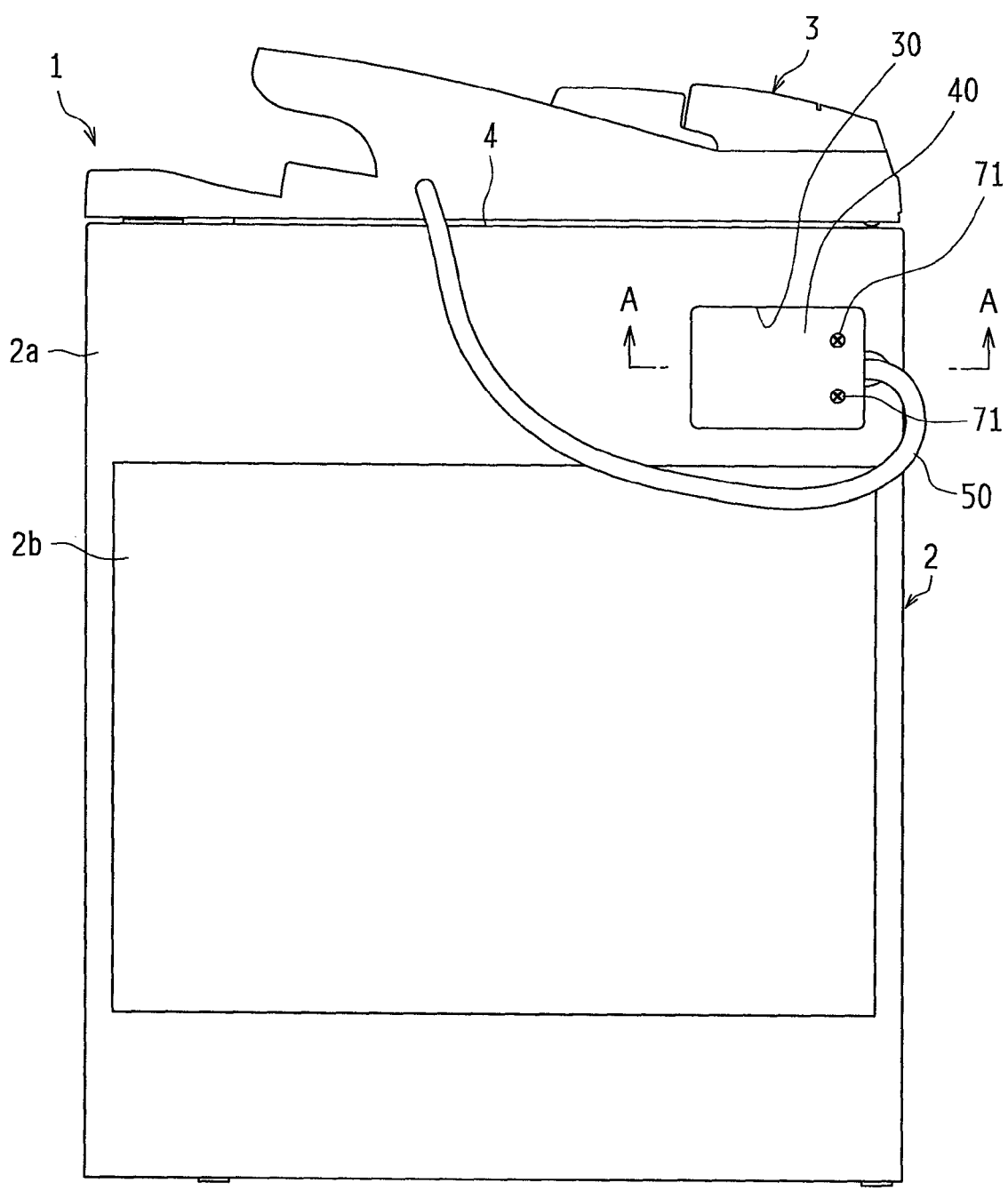
FIG. 2 is a back view showing a part of the image forming apparatus according to the embodiment.

FIG. 1 is a schematic cross-sectional view showing an example of the configuration of an image forming apparatus according to an embodiment of the present invention, and FIG. 2 is a back view thereof.

An image forming apparatus 1 of this embodiment is an apparatus that forms multicolor and monochromatic images on a predetermined sheet (recording paper) according to image data and the like that have been transmitted from the outside, and is constituted by an image forming apparatus main body (hereinafter simply referred to as "apparatus main body") 2 provided with at least an image formation portion 2B and a scanner portion 2A, and an automatic document feeder 3. That is to say, in this embodiment, the image forming apparatus main body 2 corresponds to "first apparatus" and "another apparatus" as set forth in the claims, and the automatic document feeder 3 corresponds to "second apparatus" and "one apparatus" as set forth in the claims.

The automatic document feeder 3 automatically conveys a document onto a platen 4 that is formed of hard, transparent glass and disposed in an upper portion of the apparatus main body 2. Moreover, the automatic document feeder 3 is configured so as to be pivotable in the direction of arrow M, so that a document can be manually placed on the platen 4 by opening a space above the platen 4.

The scanner portion 2A reads an image of a document placed on the platen 4, or of a document fed from the automatic document feeder 3, by a CCD sensor 88 via a lamp unit 83, mirrors 84 to 86, and a lens unit 87, and sends image data on the read image to the image formation portion 2B.

Image data that is handled in the image formation portion 2B corresponds to color images that respectively use the colors black (K), cyan (C), magenta (M), and yellow (Y). Accordingly, four chargers 6, four developers 7, four photosensitive drums (hereinafter referred to as "photosensitive members") 8, and four cleaner units 9 are provided so as to form four types of latent images corresponding to the respective colors, and are respectively set for K, C, M, and Y.

An exposure unit 5 has a function of exposing the photosensitive members 8 charged by the respective chargers 6 to a light beam in accordance with image data and the like that have been input, thereby forming electrostatic latent images corresponding to the image data on the surface of the photosensitive members 8.

The chargers 6 are charging means for uniformly charging the surface of the respective photosensitive members 8 to a predetermined potential. The developers 7 develop the electrostatic latent images formed on the surface of the respective photosensitive members 8 into visible images with four color (Y, M, C, and K) toners. Moreover, the cleaner units 9 remove and collect toners remaining on the surface of the respective photosensitive member 8 after the development and image transfer.

An intermediate transfer belt unit 10 that is disposed above the photosensitive members 8 has a function of successively transferring and superposing the toner images in the respective colors that have been formed on the photosensitive members 8 onto an intermediate transfer belt 11, which is an intermediate transfer member provided so as to make contact with each photosensitive member 8, thereby forming a color toner image (multicolor toner image). The intermediate transfer belt 11 is stretched and driven by an intermediate transfer belt driving roller 12, an intermediate transfer belt idler roller 13, and intermediate transfer rollers 14. The transfer of toner images from the photosensitive members 8 onto the intermediate transfer belt 11 is performed by the intermediate transfer rollers 14 that are in contact with an inner side of the intermediate transfer belt 11. A high-voltage transfer bias (a high voltage of opposite polarity (−) from the charge polarity (−) of the toners) is applied to the intermediate transfer rollers 14 in order to transfer the toner images.

As described above, the electrostatic images that have been developed into visible images corresponding to the respective hues on the surface of the photosensitive members 8 are laminated on the intermediate transfer belt 11. Due to the rotation of the intermediate transfer belt 11, the laminated image information is transferred onto paper by a transfer roller 15 that is disposed in a position at which the paper comes into contact with the intermediate transfer belt 11. At this time, the intermediate transfer belt 11 and the transfer roller 15 are brought into pressured contact with each other with a predetermined nip pressure, and a voltage for transferring the toners onto the paper is applied to the transfer roller 15 (a high voltage of opposite polarity (+) from the charge polarity (−) of the toners). Moreover, as described above, a toner that adhered to the intermediate transfer belt 11 as a result of the contact with the photosensitive members 8 or a toner that was not transferred onto the paper by the transfer roller 15 and remains on the intermediate transfer belt 11 is removed and collected by an intermediate transfer belt cleaning unit 16.

A paper feed cassette 17 is a tray for storing sheets to be used for image formation and is provided below the exposure unit 5 of the apparatus main body 2. In addition, a sheet can be set in a manual paper feed cassette 18. Moreover, a paper discharge tray 19 that is provided in an upper portion of the apparatus main body 2 is a tray for accumulating printed sheets facedown.

Moreover, a paper conveyance path S for conveying sheets from the paper feed cassette 17 and the manual paper feed cassette 18 to the paper discharge tray 19 via the transfer roller 15 and a fixing unit 20 is provided in the apparatus main body 2. Pickup rollers 21, a plurality of conveyance rollers 22, a registration roller 23, the transfer roller 15, the fixing unit 20, and the like are arranged in the vicinity of the paper conveyance path S from the paper feed cassette 17 or the manual paper feed cassette 18 to the paper discharge tray 19.

The conveyance rollers 22 are small rollers for promoting and assisting the conveyance of sheets and are provided in a plurality of positions along the paper conveyance path S. Moreover, the pickup rollers 21 are provided in the vicinity of respective end portions of the paper feed cassette 17 and the manual paper feed cassette 18, and pick up one sheet from the paper feed cassette 17 or the manual paper feed cassette 18 at a time and supply the sheet to the paper conveyance path S.

Moreover, the registration roller 23 is a roller that temporarily holds the sheet that is being conveyed along the paper conveyance path S. The registration roller 23 has a function of conveying the sheet to the transfer roller 15 at a timing when a leading end of a toner image on the surface of the intermediate transfer belt 11 and a leading end of the sheet coincide with each other.

The fixing unit 20 has a function of fusing the toners by thermocompression onto the sheet with a heat roller 24 and a pressure roller 25, thereby melting, mixing, and bringing into pressured contact the multicolor toner image that has been transferred onto the sheet to thermally fix the toner image to the sheet. Moreover, an external heating belt 26 for externally heating the heat roller 24 is provided in the fixing unit 20. As a result of the sheet passing through the fixing unit 20, the unfixed toners are melted and fixed to the sheet under heat, and this sheet is, for example, discharged onto the paper discharge tray 19 via the conveyance roller 22 that is disposed along the paper conveyance path S downstream of the fixing unit 20.

In the image forming apparatus 1 having the above-described configuration, according to this embodiment, an opening portion 30 to which a lid 40 is attached is provided in an upper portion of a housing of the apparatus main body 2 on a back face 2a side, and a cable-side connector provided at a front end of an electrical cable 50 that extends to the outside from a back face side of the automatic document feeder 3 is removably connected, through this opening portion 30, to a board-side connector of a circuit board that is disposed within the apparatus main body 2.

Hereinafter, a connecting apparatus for this electrical cable 50 will be specifically described.

Figure 3:
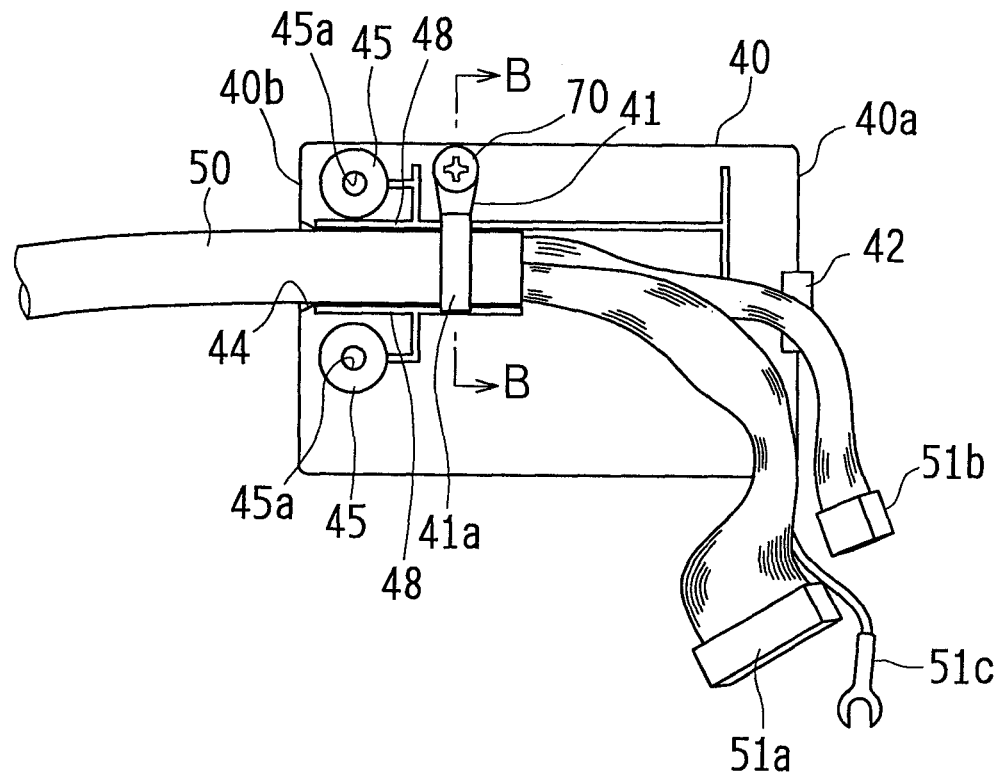
FIG. 3 is a diagram showing a rear face of a lid to which a front end portion of an electrical cable is attached.
Figure 4:
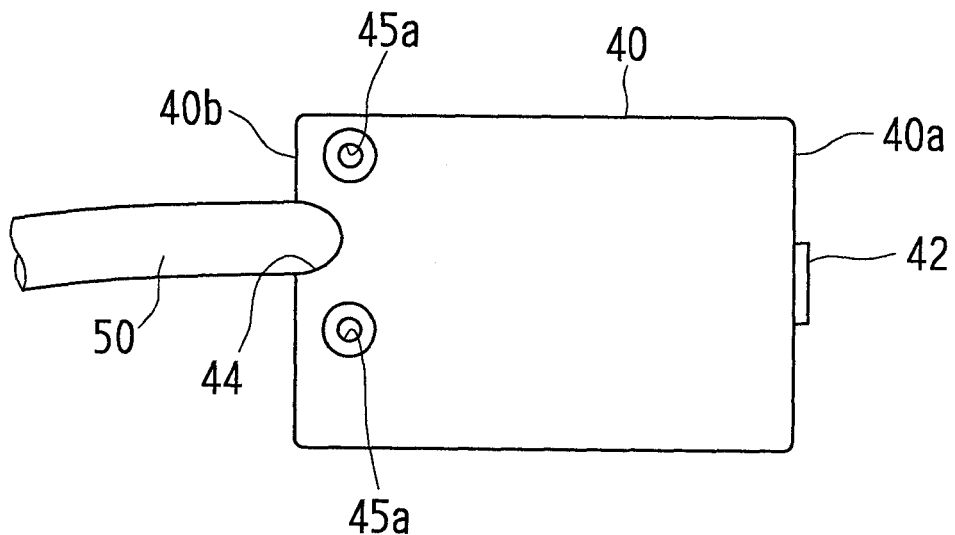
FIG. 4 is a diagram showing a front face of the lid to which the front end portion of the electrical cable is attached.
Figure 5:
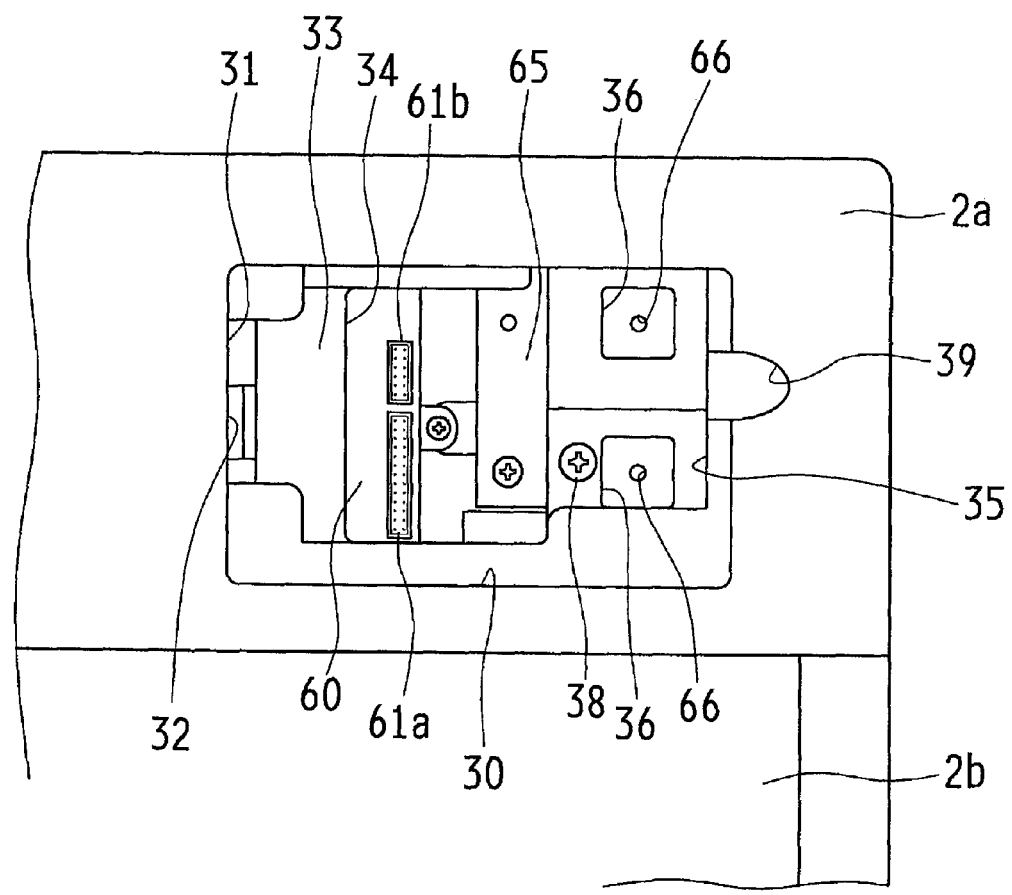
FIG. 5 is an enlarged view showing an opening portion and its surroundings.
Figure 6:
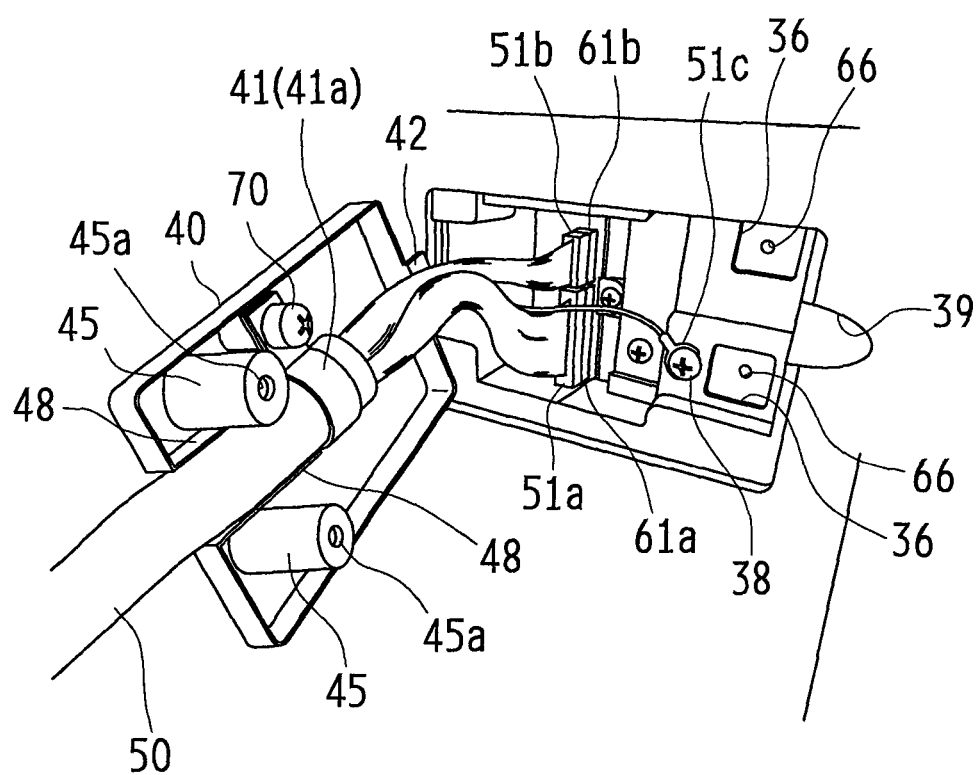
FIG. 6 is an explanatory diagram showing a process for attaching the lid to the opening portion.
Figure 7:
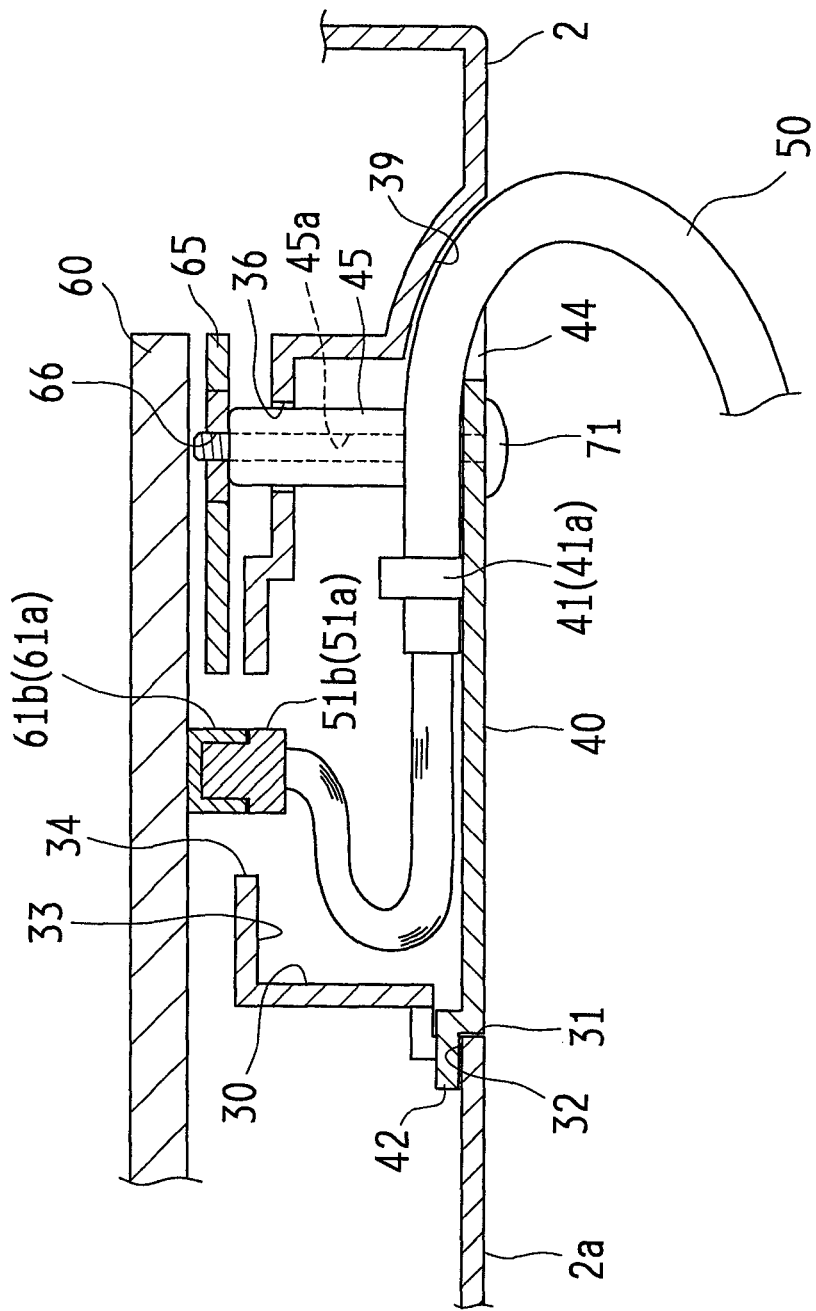
FIG. 7 is a schematic cross-sectional view taken along line A-A in FIG. 2.

FIGS. 3 to 7 show a specific configuration of an electrical cable connecting apparatus according to this embodiment; FIG. 3 is a diagram showing a rear face of a lid to which a front end portion of an electrical cable is attached, FIG. 4 is a diagram showing a front face of the lid to which the front end portion of the electrical cable is attached, FIG. 5 is an enlarged view of an opening portion and its surroundings, FIG. 6 is an explanatory diagram showing a process for attaching the lid to the opening portion, FIG. 7 is a schematic cross-sectional view taken along line A-A in FIG. 2, and FIG. 8 is a cross-sectional view taken along line B-B in FIG. 3.

In the electrical cable connecting apparatus of this embodiment, a front end portion of the electrical cable 50 extending to the outside from the back face side of the automatic document feeder 3 is attached to the rear face of the lid 40 by an attachment member 41 (see FIG. 3). That is to say, the front end portion of the electrical cable 50 and the lid 40 are combined. Moreover, cable-side connectors 51a and 51b and a grounding terminal 51c are provided at the front end of the electrical cable 50.

The lid 40 is formed into an oblong rectangular shape, and on one short-side side edge portion (the side edge portion on the right side in FIGS. 3 and 4) 40a, a hook 42 that is for engaging with an engagement slot 32 of the opening portion 30, which will be described later, is provided. Moreover, on the other side edge portion (the side edge portion on the left side in FIGS. 3 and 4) 40b, which is on the opposite side from the hook 42, a lid-side cable outlet portion 44 is provided which is formed into a recessed shape in order to allow the electrical cable 50 to extend to the outside. On the rear face of the lid 40 in the vicinity of this lid-side cable outlet portion 44, screw insertion bosses (screw fixing portions) 45 having respective screw insertion holes 45a are provided in two positions vertically above and below the lid-side cable outlet portion 44.

Figure 8:
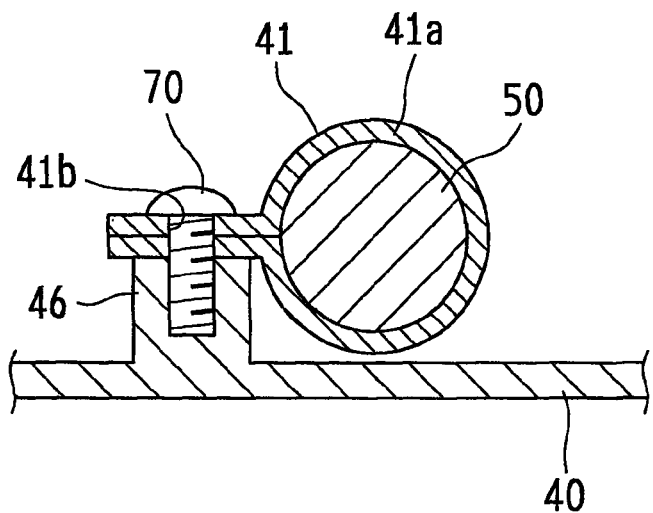
FIG. 8 is a cross-sectional view taken along line B-B in FIG. 3.
Figure 9:
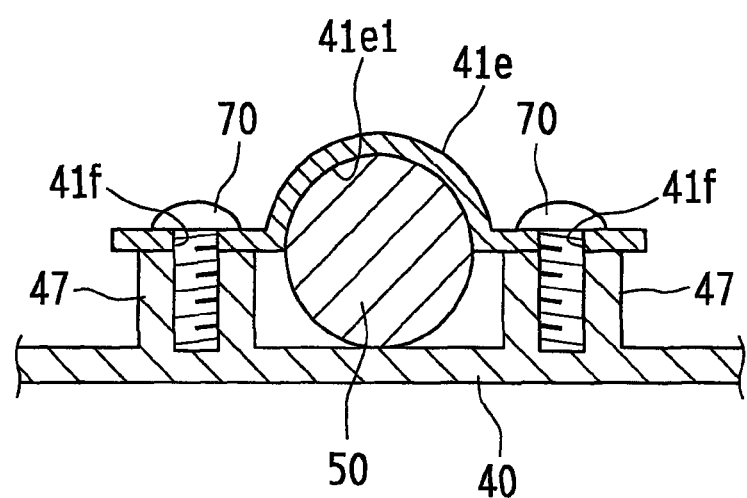
FIG. 9 is a cross-sectional view showing another example of an electrical cable attachment member that uses a resin band.

The attachment member 41 is provided on the rear face of the lid 40 and between the hook 42 and the screw insertion bosses 45, and as shown in FIG. 8, the electrical cable 50 is laterally sandwiched by an approximately U-shaped resin band 41a, both end portions of the resin band 41a are joined together, and in this state, a screw member 70 is inserted into screw insertion holes 41b provided in those end portions and is then screwed into a screw receiving portion 46 provided on the rear face of the lid 40, and thus, the electrical cable 50 is attached to the rear face of the lid 40. However, the attachment member 41 is not limited to the approximately U-shaped resin band 41a as described above, and alternatively, for example, as shown in FIG. 9, a structure may be adopted in which a resin band 41e having in its central portion a semicircular arc-shaped retaining portion 41e1 that retains the electrical cable 50 is used, screw members 70 are inserted through respective screw insertion holes 41f provided in both end portions of the resin band 41e and is then screwed into respective screw receiving portions 47 provided on the rear face of the lid 40, and thus the electrical cable 50 is attached to the lid 40.

Moreover, between the lid-side cable outlet portion 44 and the attachment member 41 (the resin band 41a), positioning ribs 48, which serve as positioning means for determining a cable arrangement position by holding the electrical cable 50 from above and below, are disposed in positions adjacent to the respective screw insertion bosses 45 and are opposing each other.

On the other hand, the opening portion 30 is, as shown in FIG. 5, formed into an oblong rectangular shape, and the engagement slot 32 for engaging with the hook 42 of the lid 40 is provided in a central portion of a left-side side edge portion 31 in a height direction (the vertical direction in FIG. 5).

Moreover, a connector opening portion 34 is provided in a back face 33 of the opening portion 30, and board-side connectors 61a and 61b of a circuit board 60 disposed within the apparatus main body 2 are provided so as to be positioned in this connector opening portion 34 and exposed into the opening portion 30.

Moreover, screwing opening portions 36 are provided in the back face 33 of the opening portion 30 above and below each other in the vicinity of a right-side side edge portion 35, and in these screwing opening portions 36, screw holes 66 that are formed in a metal frame 65 disposed within the apparatus main body 2 are respectively disposed opposing each other. That is to say, the screwing opening portions 36 are disposed so that when the lid 40 is attached to the opening portion 30, they face the respective screw insertion bosses 45, which are provided vertically above and below each other on the rear face of the lid 40, with the screw holes 66 formed in the metal frame 65 facing the respective screw insertion holes 45a of the screw insertion bosses 45.

As described above, in this embodiment, a combination of the hook 42 and the screw insertion bosses 45 is used as a fixing member that attaches and fixes the lid 40 to the opening portion 30. Thus, fixing by screwing is only required on the other side edge portion 40b side of the lid 40 where the screw insertion bosses 45 are provided, and accordingly, the operation for attaching the lid 40 to the opening portion 30 is simplified. Moreover, since the other side edge portion 40b side is fixed by screwing, even if some external force is applied, there is no risk that the circuit board 60 and the board-side connectors 61a and 61b may be damaged, because the lid 40 itself is firmly fixed to the opening portion 30.

It should be noted that reference numeral 38 in FIG. 5 indicates a grounding screw for connecting the grounding terminal 51c provided at the front end of the electrical cable 50.

Moreover, in an approximately central portion of the right-side side edge portion 35, which opposes the side edge portion 31 in which the engagement slot 32 is provided, an opening-side cable outlet portion 39 is formed which is formed into a recessed shape (formed into a semi-conical shape) to allow the electrical cable 50 to extend from inside the opening portion 30 to the outside (or extend into the opening portion 30 from the outside).

Next, cable connecting procedures of the cable connecting apparatus that employs the lid 40 and the opening portion 30 having the above-described configuration will be described.

First, the lid 40 is attached, with the attachment member, to the front end portion of the electrical cable 50 extending from the automatic document feeder 3. That is to say, as shown in FIG. 8, the front end portion of the electrical cable 50 is laterally sandwiched by the resin band 41a, which is formed into an approximately U-shape, the both end portions of the resin band 41a are joined together, and in this state, the screw member 70 is inserted through the screw insertion holes 41b provided in those end portions and is then screwed into the screw receiving portion 46 provided on the rear face of the lid 40. The electrical cable 50 is thus attached and fixed to the rear face of the lid 40. At this time, as shown in FIG. 3, the electrical cable 50 located between the lid-side cable outlet portion 44 and the resin band 41a is positioned in such a manner so as to be held between the positioning ribs 48. That is to say, the electrical cable 50 extending to the outside from the lid 40 is arranged so as to pass through the lid-side cable outlet portion 44.

Then, in this state, as shown in FIG. 6, the cable-side connectors 51a and 51b provided at the front end of the electrical cable 50 are connected to the board-side connectors 61a and 61b.

Then, in this state, the hook 42 of the lid 40 is laterally brought into engagement with the engagement slot 32 of the opening portion 30, and the lid 40 is installed in the opening portion 30 in such a manner that the lid 40 is pivoted at this engagement portion and pressed into the opening portion 30 side. At this time, the electrical cable 50 extends out along an approximately circular arc-shaped (or oblong ellipse-shaped) cable outlet portion formed by the approximately semicircular arc-shaped lid-side cable outlet portion 44 and the approximately semicircular arc-shaped opening-side cable outlet portion 39 opposing each other, and is naturally curved. Moreover, in this state, as shown in FIG. 7, respective front ends of the screw insertion bosses 45 of the lid 40 pass through the screwing opening portions 36 formed in the back face 33 of the opening portion 30 and face the screw holes 66 formed in the metal frame 65.

Accordingly, in this state, the lid 40 is fixed to the opening portion 30 by inserting screw members 71 into the respective screw insertion holes 45a of the screw insertion bosses 45 from the front side of the lid 40 and then screwing them into the respective screw holes 66 of the metal frame 65.

It should be noted that to disconnect the electrical cable 50, the lid 40 can be removed from the opening portion 30 by following the above-described procedures in reverse.

With the electrical cable connecting apparatus of this embodiment, for example, when the automatic document feeder 3 is removed from the apparatus main body 2, it is not necessary to remove the backplate 2b (see FIG. 2) provided in the back face 2a of the housing of the apparatus main body 2, and the cable-side connectors 51a and 51b of the electrical cable 50 attached to the lid 40 can be easily removed from the board-side connectors 61a and 61b by removing only the lid 40 from the opening portion 30. Moreover, since the electrical cable 50 is attached to the lid 40 by the resin band 41a, which is the attachment member 41, even if some external force is applied to the electrical cable 50 that is exposed to the outside, this external force is first applied to the resin band 41a, which is the attachment member 41 on the lid 40, and then to the screw fixing portion formed by the screw insertion holes 45a of the screw insertion bosses 45 and the screw holes 66 of the metal frame 65. Accordingly, the external force is not directly applied to respective connecting portions between the cable-side connectors 51a and 51b and the board-side connectors 61a and 61b. Therefore, there is no risk that the circuit board 60 and the board-side connectors 61a and 61b may be damaged.

Moreover, also when the automatic document feeder 3 is mounted on the apparatus main body 2, it is only required that the automatic document feeder 3, with the lid 40 attached to the electrical cable 50, is mounted on the apparatus main body 2, thereafter the cable-side connectors 51a and 51b with the lid 40 are connected to the board-side connectors 61a and 61b, and the lid 40 is attached and fixed to the opening portion 30. Therefore, the attachment operation is also simple.

Moreover, in the above-described connecting procedures, the electrical cable 50 can also be fixed simply by attaching the lid 40 to the opening portion 30. That is to say, after the cable-side connectors 51a and 51b are connected to the board-side connectors 61a and 61b, the process for attaching the electrical cable 50 to the apparatus main body 2 can be omitted, and the connecting process can be simplified accordingly.

Moreover, with the cable connecting apparatus of this embodiment, the screw insertion bosses 45 are arranged on both sides of the electrical cable 50. In this manner, by employing a structure in which the screw insertion bosses 45 are arranged on both sides of the electrical cable 50 and fixed to the metal frame 65 in the vicinity of the lid-side cable outlet portion 44, it is possible to strengthen a force for fixing the electrical cable 50 against an external force even more.

Moreover, with the electrical cable connecting apparatus of this embodiment, a configuration is employed in which the positioning ribs 48 that determine the arrangement position of the electrical cable 50 are provided between the lid-side cable outlet portion 44 and the screw insertion bosses 45. By providing the positioning ribs 48 in this manner, it is possible to properly position the electrical cable 50 on the rear face of the lid 40.

It should be noted that in the above-described embodiment, the electrical cable 50 extends out from the left side of the back face of the automatic document feeder 3, is routed in a lateral direction, and enters the opening portion 30 on the right side of the back face of the apparatus main body 2 in such a manner that it bends back on itself, but the manner in which the electrical cable 50 is routed varies depending on the position of the circuit board that is provided on the apparatus main body 2 side or the position at which the electrical cable 50 extends out from the automatic document feeder 3. For example, in a case where the position at which the electrical cable 50 extends out from the automatic document feeder 3 and the position at which the circuit board on the apparatus main body 2 side is disposed are vertically one above the other, the electrical cable 50 can be simply routed down along a semicircular arc. In this case, the state in which the lid 40 and the opening portion 30 are arranged can also be changed to a state rotated 90° in a clockwise direction from the state shown in FIG. 2.

Moreover, in the above-described embodiment, a case where the present invention is applied to an image forming apparatus has been described, but the present invention is not limited to an image forming apparatus and is applicable to all the apparatuses having a configuration in which a first apparatus and a second apparatus are electrically connected to each other by an output cable that extends to the outside.

That is to say, the embodiment disclosed herein is to be considered in all respects as illustrative only and does not serve as the basis for restrictive interpretation. Therefore, the technical scope of the present invention should not be interpreted based on only the above-described embodiment, and is defined by the appended claims. Furthermore, all changes which come within the meaning and scope of equivalency of the claims are intended to be embraced by the technical scope of the present invention.

What is claimed is:

1. An electrical cable connecting apparatus comprising a first apparatus and a second apparatus, and having a configuration in which a cable-side connector provided at a front end of an electrical cable extending from the second apparatus is removably connected to a board-side connector provided on a circuit board of the first apparatus,
   wherein an opening portion is provided in a housing of the first apparatus at a position facing the board-side connector,
   a lid that covers the opening portion is attached to a front end portion of the electrical cable by an attachment member,
   the lid is configured to be attachable to the opening portion by a fixing portion in a state in which the cable-side connector is connected to the board-side connector,
   the fixing portion includes an engaging portion that is provided on one side edge portion of the lid and is for engaging with a side edge portion of the opening portion, and a securing portion that is provided on another side edge portion side opposing the one side edge portion of the lid and is for fixing to the first apparatus,
   a lid-side cable outlet portion through which the electrical cable extends to the outside is provided in the lid,
   the lid-side cable outlet portion is formed by partially recessing the lid along a periphery thereof, and
   the engaging portion, the securing portion, and the lid-side cable outlet portion are disposed in this sequence along a face of the lid.

2. The electrical cable connecting apparatus according to claim 1, wherein the opening portion and the lid are each formed into a rectangular shape.

3. The electrical cable connecting apparatus according to claim 2, wherein the attachment member is provided on a rear face of the lid at a position closer to the securing portion than to the engaging portion between the engaging portion and the securing portion.

4. The electrical cable connecting apparatus according to claim 2, wherein an opening-side cable outlet portion through which the electrical cable extends to the outside is provided in the opening portion, and when the lid is attached to the opening portion, the opening-side cable outlet portion is disposed in the vicinity of the securing portion of the lid.

5. The electrical cable connecting apparatus according to claim 4, wherein the lid-side cable outlet portion is disposed at a position of a side edge portion facing the opening-side cable outlet portion and in the vicinity of the securing portion.

6. The electrical cable connecting apparatus according to claim 4, wherein the securing portion has a structure where both sides of the electrical cable are fixed.

7. The electrical cable connecting apparatus according to claim 5,
   wherein a positioning means that determines an arrangement position of the electrical cable is provided between the lid-side cable outlet portion and the attachment member.

8. An image forming apparatus comprising the electrical cable connecting apparatus according to claim 1.

9. The image forming apparatus according to claim 8,
   wherein any one of the first apparatus and the second apparatus is an image forming apparatus main body including at least an image formation portion and a scanner portion, and the other apparatus is an automatic document feeder.

10. An electrical cable connecting apparatus comprising a first apparatus and a second apparatus, and having a configuration in which a cable-side connector provided at a front end of an electrical cable extending from the second apparatus is connected to a board-side connector provided on a circuit board of the first apparatus,
    said electrical cable connecting apparatus further comprising:
    an opening portion provided in a housing of the first apparatus at a position facing the board-side connector;
    a lid that covers the opening portion; and
    an attachment member that regulates movement out of the first apparatus of the electrical cable in conjunction with the lid, the attachment member being attached to the electrical cable,
    wherein the lid is configured to be attachable to the opening portion by a fixing portion in a state in which the cable-side connector is connected to the board-side connector,
    the fixing portion includes an engaging portion that is provided on one side edge portion of the lid and is for engaging with a side edge portion of the opening portion, and a securing portion that is provided on another side edge portion side opposing the one side edge portion of the lid and is for fixing to the first apparatus, and
    the attachment member is provided over the electrical cable on a rear face of the lid and closer to the securing portion than to the engaging portion between the engaging portion and the securing portion.

11. The electrical cable connecting apparatus according to claim 10,
    wherein when the lid is attached to the opening portion, the electrical cable extends to the outside from an edge portion that is located closer to the securing portion than to the engaging portion of the lid.

12. The electrical cable connecting apparatus according to claim 10,
    wherein the opening portion has an opening-side cable outlet portion having a partially recessed shape through which the electrical cable extends to the outside from the inside of the opening portion.

13. The electrical cable connecting apparatus according to claim 10,
   wherein the lid has a lid-side cable outlet portion having a partially recessed shape through which the electrical cable extends to the outside from the inside of the opening portion.

14. The electrical cable connecting apparatus according to claim 10,
   wherein the securing portion has a structure where both sides of the electrical cable are fixed.

15. The electrical cable connecting apparatus according to claim 13,
   wherein a positioning section that determines an arrangement position of the electrical cable is provided between the lid-side cable outlet portion and the attachment member for the electrical cable and at least near the lid-side cable outlet portion.

16. The electrical cable connecting apparatus according to claim 10,
   wherein the attachment member is a resin band attached to the electrical cable.

17. The electrical cable connecting apparatus according to claim 10,
   wherein the lid is fixed by securing portions being disposed opposing each other in fixing holes formed in a frame in the opening portion.

18. The electrical cable connecting apparatus according to claim 10,
   wherein a plurality of cable-side connectors and a grounding terminal are provided at a front end of the electrical cable.

19. The electrical cable connecting apparatus according to claim 10,
   wherein a position at which the electrical cable extends out from the second apparatus and the opening portion of the first apparatus are vertically one above the other, and
   the electrical cable is routed along an arc from a second apparatus side to the first apparatus.

20. The electrical cable connecting apparatus according to claim 10,
   wherein the housing of the first apparatus has a backplate that is removable to a side opposite the second apparatus across the opening portion.

21. An image forming apparatus comprising the electrical cable connecting apparatus according to claim 10.

22. The image forming apparatus according to claim 21,
   wherein any one of the first apparatus and the second apparatus is an image forming apparatus main body including at least an image formation portion and a scanner portion, and the other apparatus is an automatic document feeder.

* * * * *